United States Patent [19]

Hasegawa

[11] Patent Number: 5,043,660
[45] Date of Patent: Aug. 27, 1991

[54] SIGNAL PROCESSING CIRCUIT FOR MOVEMENT TRACKING ENCODER INCLUDING POSITIVE AND NEGATIVE FEEDBACK MEANS TO REDUCE DISTORTION

[75] Inventor: Kazuo Hasegawa, Furukawa, Japan

[73] Assignee: Alps Electric Co., Ltd., Tokyo, Japan

[21] Appl. No.: 406,395

[22] Filed: Sep. 12, 1989

[30] Foreign Application Priority Data

Dec. 21, 1988 [JP] Japan .................... 63-320360

[51] Int. Cl.$^5$ .............................................. G01B 7/14
[52] U.S. Cl. ........................... 324/207.12; 324/207.21; 324/207.25

[58] Field of Search ................ 324/207.11, 207.12, 324/207.2, 207.21, 207.22, 207.24, 207.25, 225, 235, 251, 252; 338/32 R, 32 H; 307/309

[56] References Cited

U.S. PATENT DOCUMENTS 4,520,311  5/1985  Petr et al. .

Primary Examiner—Walter E. Snow
Attorney, Agent, or Firm—Guy W. Shoup; Paul J. Winters; B. Noel Kivlin

[57] ABSTRACT

An encoder has a positive feedback means for feeding back a polarity-inverted output signal to a comparator or an MR sensor circuit thereby to stabilize output waveform duty ratio against deviation between the sensor circuit and comparator in source voltage.

6 Claims, 10 Drawing Sheets

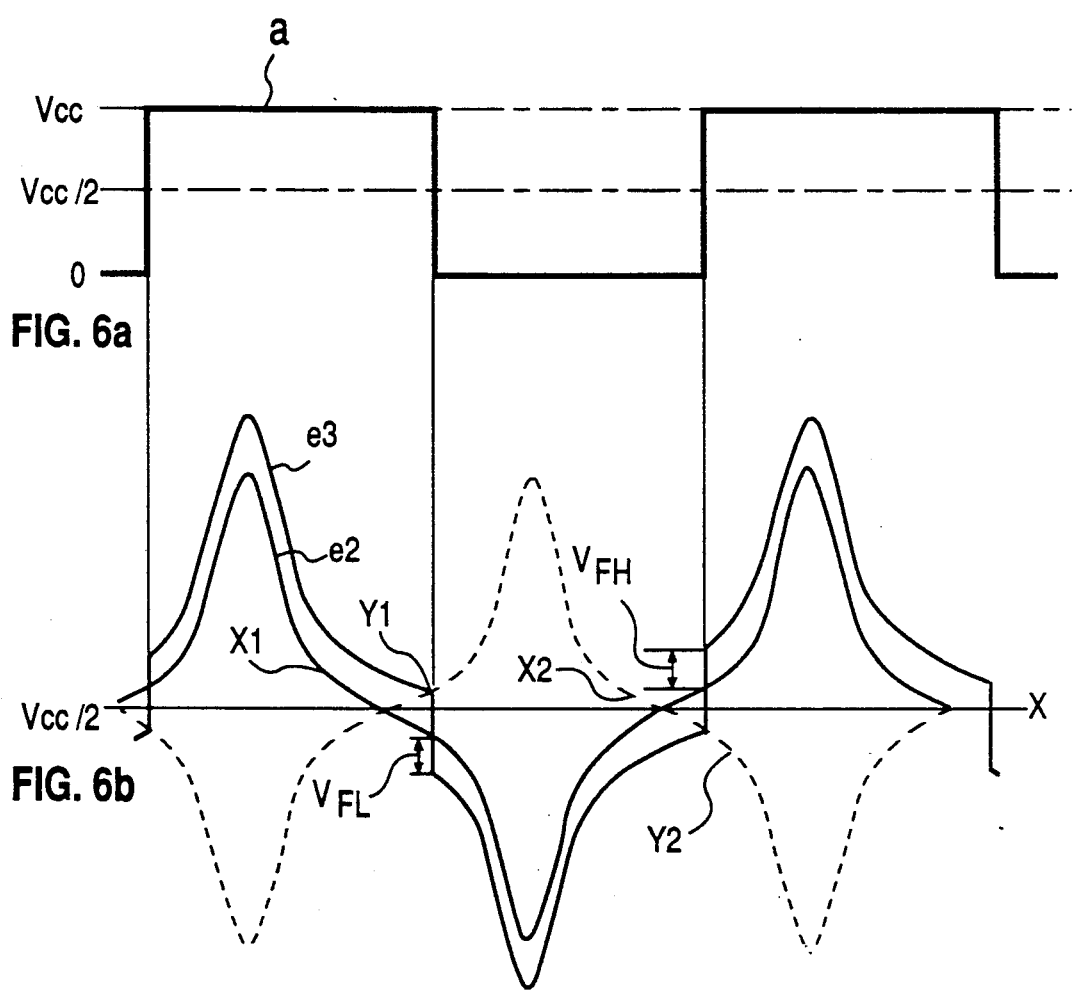

SIGNAL PROCESSING CIRCUIT FOR MOVEMENT TRACKING ENCODER INCLUDING POSITIVE AND NEGATIVE FEEDBACK MEANS TO REDUCE DISTORTION

BACKGROUND OF THE INVENTION

1. Field of the Invention

This invention relates to an improved signal processing circuit for a movement detecting encoder device which tracks the movement of a body by means of sensors which track the movement of a scale attached to the body.

Such movement detecting encoders are well known in the art, as for example the magnetic rotary encoder disclosed in U.S. Pat. No. 4,774,464. A similar example of a magnetic rotary encoder is shown in FIG. 5a. A magnetic drum 50 is provided with a scale, which is an array of magnetic elements 51, that produces a changing magnetic field as magnetic drum 51 rotates. The changing magnetic field is detected by MR sensors 1a, 1b. Signal processing circuits for such encoders are also well known in the art, for example, as disclosed in U.S. Pat. No. 4,359,685. FIGS. 5 shows MR sensors 1a, 1b in detail in the context of a similar typical signal processing circuit made up of phase A and phase B. MR sensor 1a comprises magnetoresistive elements Ra1-Ra4 configured in a bridge circuit, and is provided with source voltage $V_{cc}$. Further, MR sensor 1a is connected to phase A of the signal processing circuit by means of sensor output nodes P1 and P2 Sensor output P1 is connected to the inverting terminal of comparator 2a by means of resistor R1a, and sensor output P2 is connected to the non-inverting terminal by means of resistor R2a.

The construction of MR sensor 1b and its connection to phase B of the signal processing circuit mirrors that of MR sensor 1a. Typically, the output of the phase B output has a phase difference of 90° ($\pi/2$) with the phase A output, and both signals are typically further processed in signal processing means such as a detection signed generator 3.

As shown in FIG. 6b, e1 and e2 represent typical sensor output waveforms at nodes P1 and P2, respectively. These waveforms are 180° out of phase with each other and intersect at action reference voltage $V_{cc}/2$ Comparator 2a is provided with source voltage $V_{cc2}=V_{cc}$ in this example, so that the output of the comparator 2a alternates between $V_{cc}$ and 0 v (ground) and similarly has action reference voltage $V_{cc}/2$. The output A of the comparator is fed back to the noninverting terminal of comparator 2a through a feedback resistor R3a causing a voltage displacement in the input waveform to the non-inverting terminal of comparator 2a, from e2 to e3. The voltage amplitude R2a, R3a, the sensor output action reference voltage $V_2$ and the comparator 2a output voltage $V_A$ according to the following equation:

(1) *Amplitude displacement* $=(V_A-V_2)\times[R2a/(R2a+R3a)]$ When the comparator output is high, $V_A$ is approximately equal to $V_{cc}$. As mentioned earlier, the action reference voltage $V_2$ of sensor output waveform e2 is $V_{cc}/2$, so when the comparator output is high the amplitude displacement is:

$$V_{fH} = (V_{cc} - V_{cc}/2) \times [R2a/(R2a + R3a)]$$
$$= (V_{cc}/2) \times [R2a/(R2a + R3a)]$$

When the comparator output is low, $V_A$ is approximately 0, and the amplitude displacement is:

$$V_{FL} = (0 - V_{cc}/2) \times [R2a/(R2a + R3a)]$$
$$= (-V_{cc}/2) \times [R2a/(R2a + R3a)]$$

Thus, the magnitude of the amplitude displacement when the source voltage of the comparator is equal to the source voltage of the sensors is the same whether the comparator output is high or low; only the sign of the amplitude displacement changes.

However, when the source voltage $V_{cc2}$ of the comparator is different from the source voltage $V_{cc}$ of sensor 1a, the magnitude of the amplitude displacement changes as well. This problem arises in prior art due to the positive feedback to the non-inverting terminal of comparator 2a through resistor R3a, which is provided to lessen the effect of noise that is typically present in a sensor output waveform as shown in FIG. 8.

For example, suppose $V_{cc2}$ equals $V_{cc}/3$ as in FIG. 7. Waveform e3, the input to the non-inverting terminal of comparator 2a, is formed as before, according to equation (1). However, since $V_{cc2}$ is not equal to $V_{cc}$, the magnitude of factor $V_A-V_{cc}$ will change when $V_A$ toggles between its high and low values. When the output of the comparator is high, amplitude displacement is given by:

$$V_{fh2}=(V_{cc}/3-V_{cc}/2)\times[R2a/(R2a+R3a)]$$

When the comparator output is low amplitude displacement is given by:

$$V_{fL2}=(0-V_{cc}/2)\times[R2a/(R2a+R3a)]$$

Since $V_{fH2}=(V_{cc}/3-V_{cc}/2)\neq(0-V_{cc}/2)=V_{fL2}$ the amplitude displacement changes as the output of the comparator changes.

Differing amplitude displacement is a problem because it causes a distortion of the duty cycle of comparator 2a output. The duty cycle is not distorted when the source voltage $V_{cc2}$ of comparator is equal to the source voltage of MR sensor 1a because the amplitude displacement is the same.

An undistorted duty cycle means that the time interval while the comparator is in the high output level or low output level accurately represents the time interval between appropriate intersection points of the sensor output waveforms. For example, referring to FIG. 6, two "output waveform intersection points" i.e. the intersection points of the sensor output waveforms e1 and e2, are labelled x1 and x2. Between x1 and x2, along the x-axis, output waveform e1, the input to the inverting terminal of comparator 2a, is greater than the output waveform e2, the input to the non-inverting terminal of comparator 2a. Therefore the comparator output $V_A$ should be low for this time interval. However, because of positive feedback, waveform e3 rather than e2 is the input to the non-inverting terminal of comparator 2a, so that the comparator output follows the intersection points of waveforms e3 and e1 ("triggering intersection points"), Y1 and Y2, rather than corresponding output intersection points x1 and x2 of waveforms e2 and e1.

Because the amplitude displacement of waveform e3 is equal in magnitude but opposite in sign when the comparator output toggles, the triggering intersection points y1 and y2 are both offset from corresponding output intersection points x1 and x2, respectively, by the same magnitude and in the same direction. Consequently the time interval during which the comparator output is low accurately represents the time interval between the output intersection points x1 and x2, and the duty cycle is not distorted.

However in FIG. 7 where $V_{cc2}$ is less than $V_{cc}$ there is a distortion in the duty cycle. The triggering intersection points y3 and y4 are offset from the corresponding output intersection points x1 and x2, respectively, in different directions because of differing amplitude displacement ($V_{fL2} \neq V_{fh2}$). Thus the time interval between y3 and y4 is greater than the time interval between corresponding output intersection points x1 and x2, respectively. Consequently the time interval of the low comparator output does not accurately represent the time interval between output intersection points x1 and x2, and there is a distortion of the duty cycle.

In summary, a difference between the source voltage $V_{cc2}$ of the comparator 2a and the source voltage $V_{cc}$ of sensor 1a results in a distortion of the duty cycle, or in other words, an inaccurate representation of the sensor output waveforms.

SUMMARY OF THE INVENTION

The present invention provides an improved signal processing circuit for an encoder such that a difference between sensor source voltage and comparator source voltage will not cause a distortion in the duty cycle. An additional positive feedback loop is provided to the inverting terminal of the comparator such that there is an amplitude displacement of both sensor output waveforms as they are input to the comparator. The additional amplitude displacement on the second sensor output waveform offsets the differing amplitude displacements of the first sensor output in such a way that when the sensor source voltage is different than the comparator source voltage the time intervals between the triggering intersection points accurately represents the time intervals between output waveform intersection points.

BRIEF DESCRIPTION OF THE DRAWINGS

FIG. 6 is a wave diagram of a prior art signal processing circuit showing sensor output waveforms, comparator input waveforms and comparator output waveforms.

DESCRIPTION OF THE PREFERRED EMBODIMENTS

Figure 1:
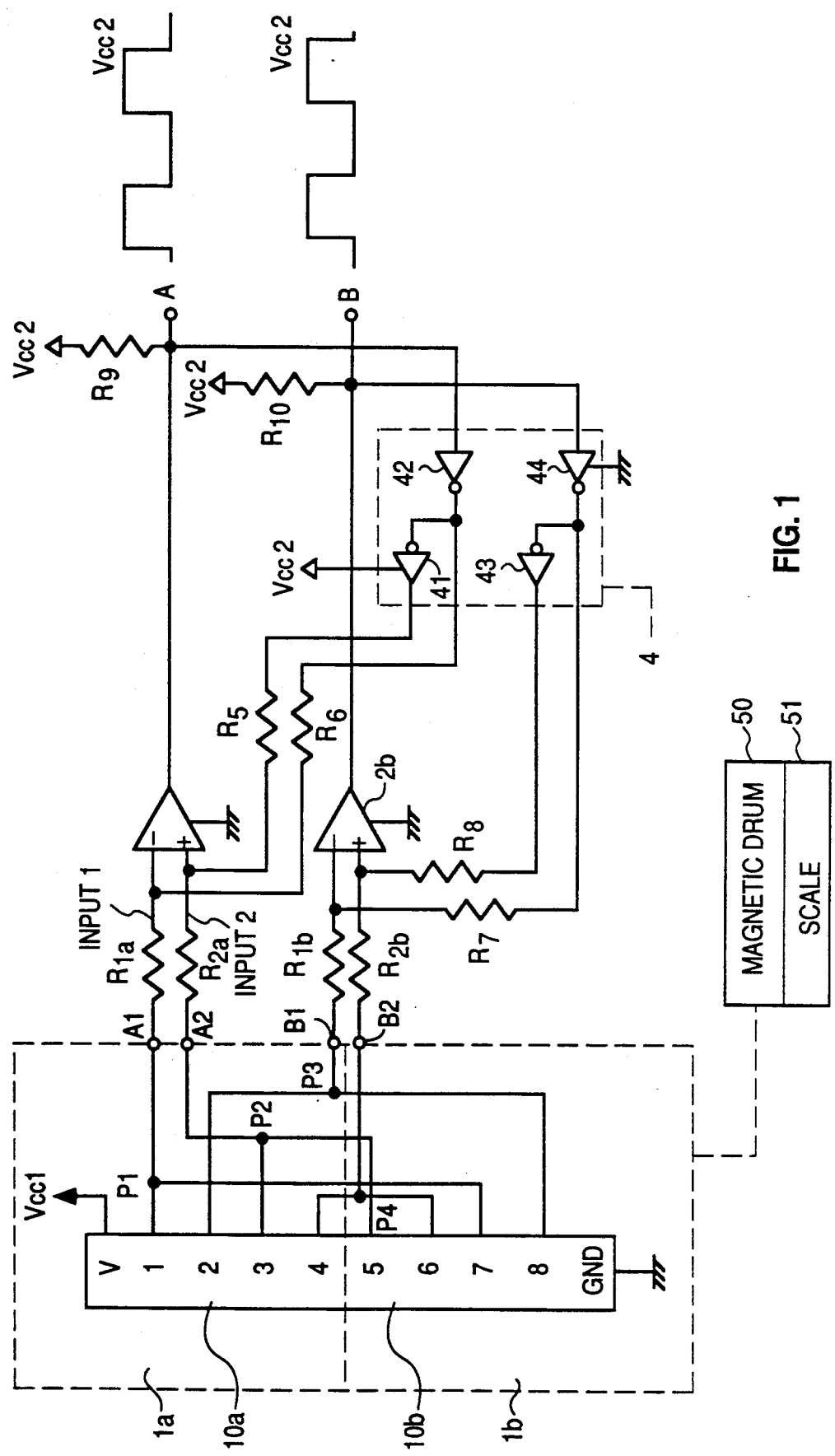
FIG. 1 is a schematic diagram of a signal processing circuit as provided by the present invention.

An embodiment of the signal processing circuit provided by the present invention is shown in FIG. 1. Stage A and stage B of the circuit are identical and thus the discussion will focus on stage A. MR sensor 1a contains an associated bridge circuit 10a and is provided with source voltage $V_{cc}$. P1 and P2 are the balancing points and A1 and A2 are the output terminals of bridge circuit 10a. R1a and R2a are resistors provided between the output terminals A1 and A2, respectively, of sensor 1a and the inverting and non-inverting input terminals, respectively, of comparator 2a. Comparator 2a is provided with source voltage $V_{cc2}$ which is applied through resistor R9. Feedback buffer 4 comprises inverters 41 and 42. The output of comparator 2a passes through both inverters 42 and 41 before being fed through resistor R5 to the non-inverting input terminal of 2a while the same output of comparator 2a is passed through only inverter 42 before being passed through resistor R6 and then being fed back to the inverting input terminal of comparator 2a.

Figure 2:
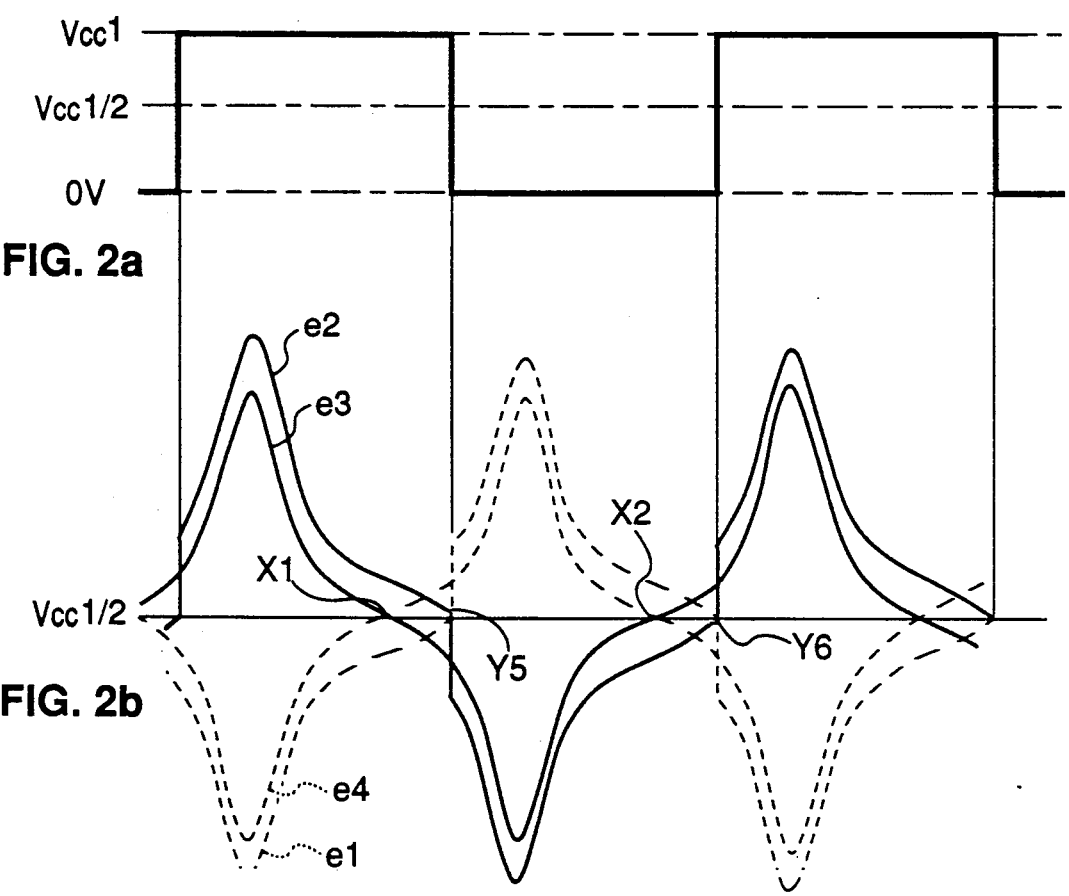
FIG. 2 is a wave diagram showing sensor output waveforms, comparator input waveforms and comparator output waveforms according to the present invention.
Figure 3:
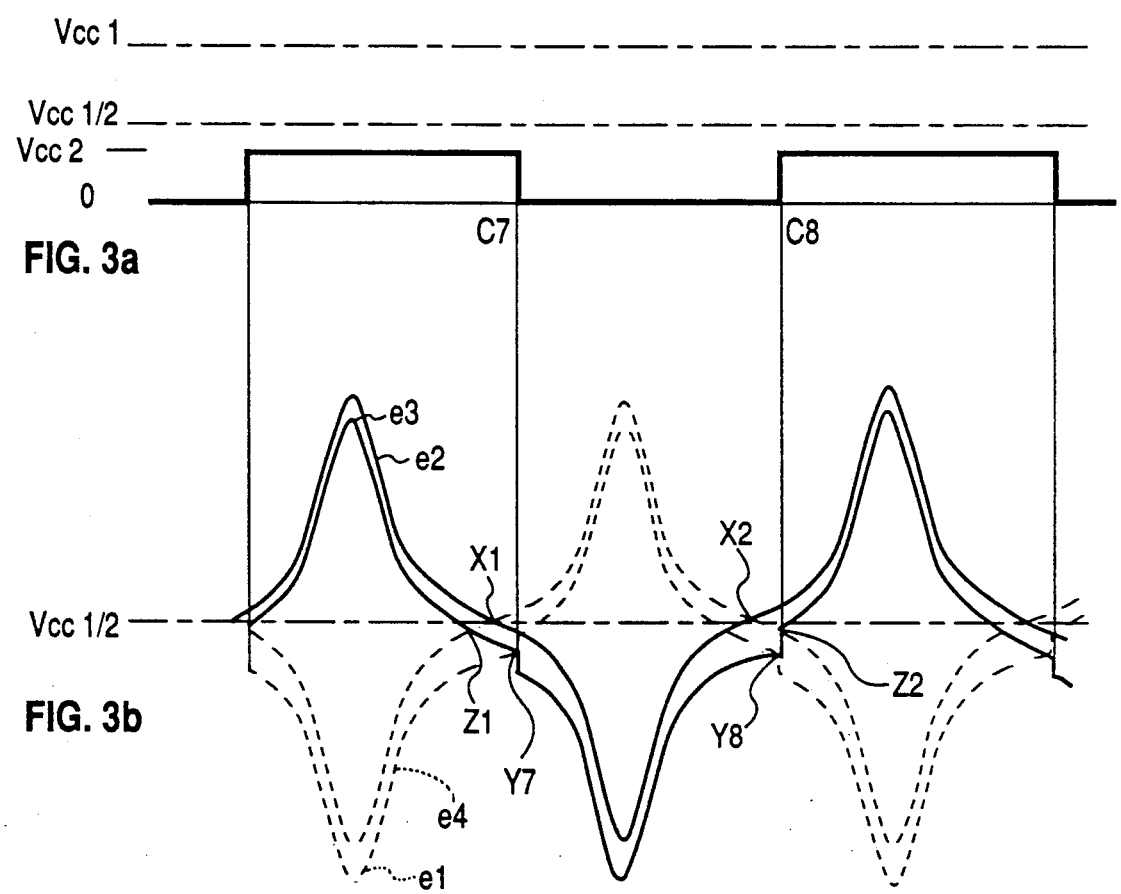
FIG. 3 is a wave diagram showing sensor output waveforms, comparator input waveforms and comparator output waveforms when $V_{cc2}$ is less than $V_{cc}$ according to the present invention.
Figure 4:
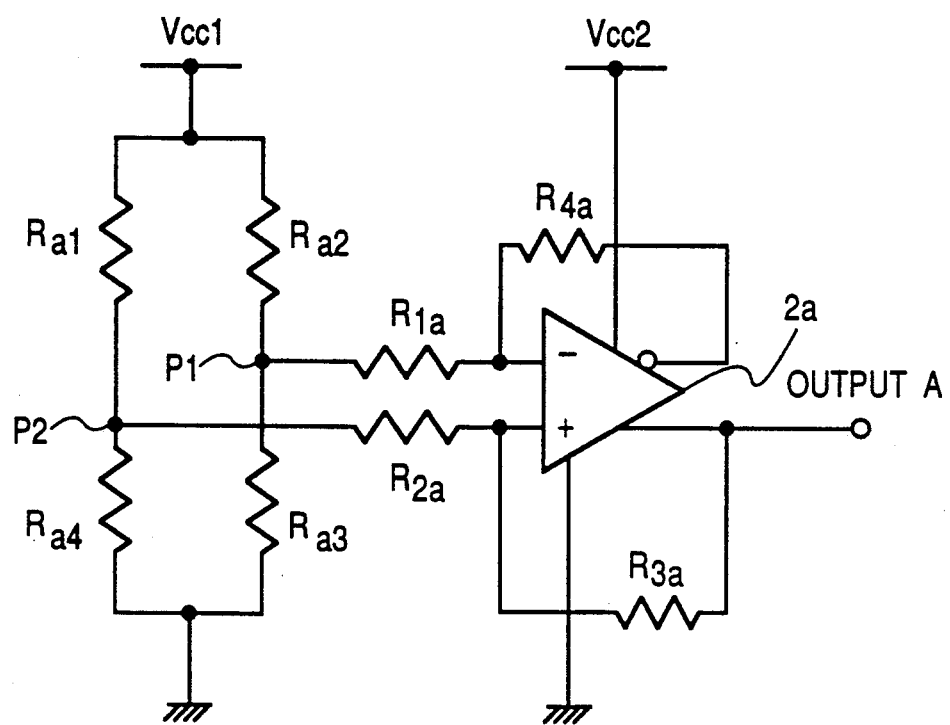
FIG. 4 is a schematic diagram of an embodiment of the present invention.
Figure 5A:
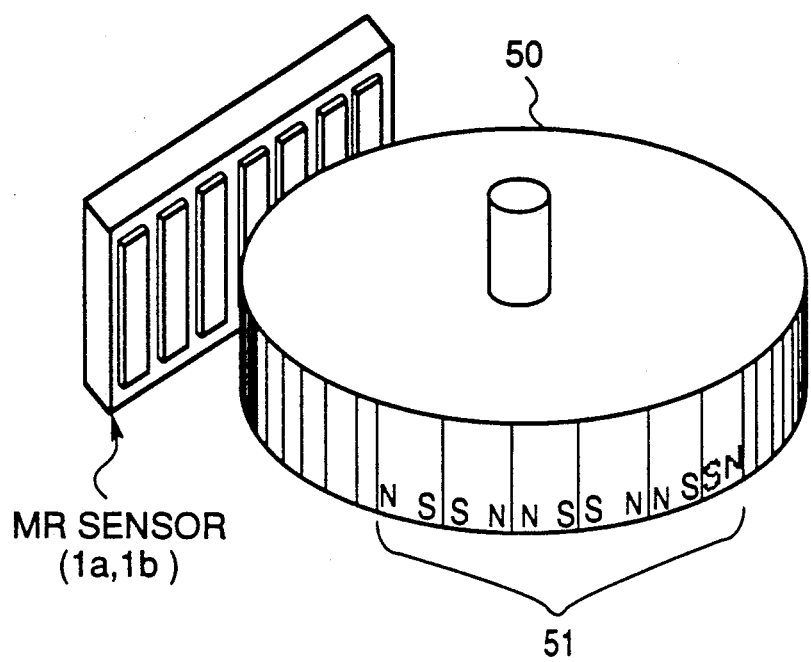
FIG. 5a is a perspective view of a prior art magnetic rotary encoder.
Figure 5B:
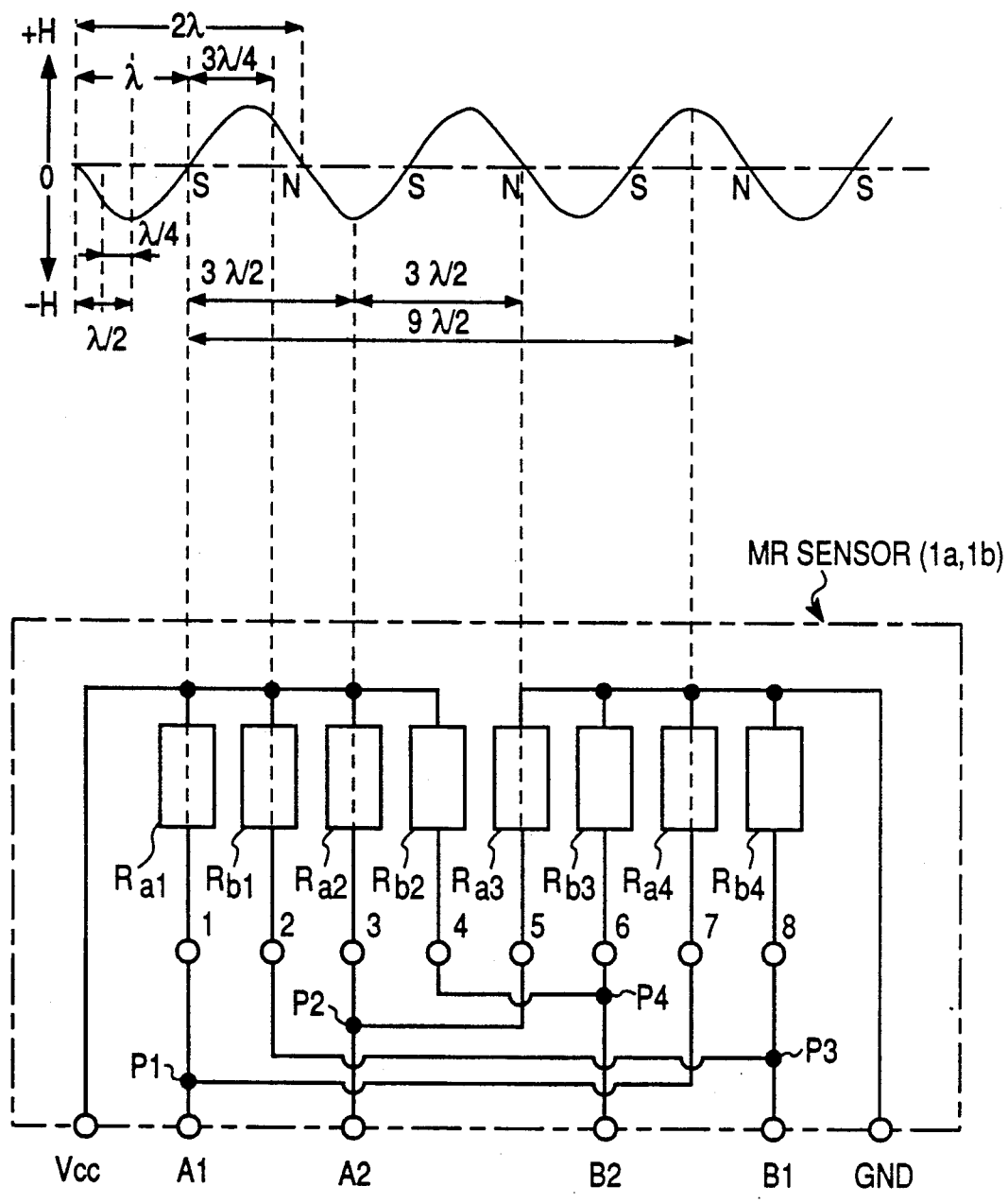
FIG. 5b is a schematic diagram of the magnetic sensors in the magnetic rotary encoder.
Figure 5C:
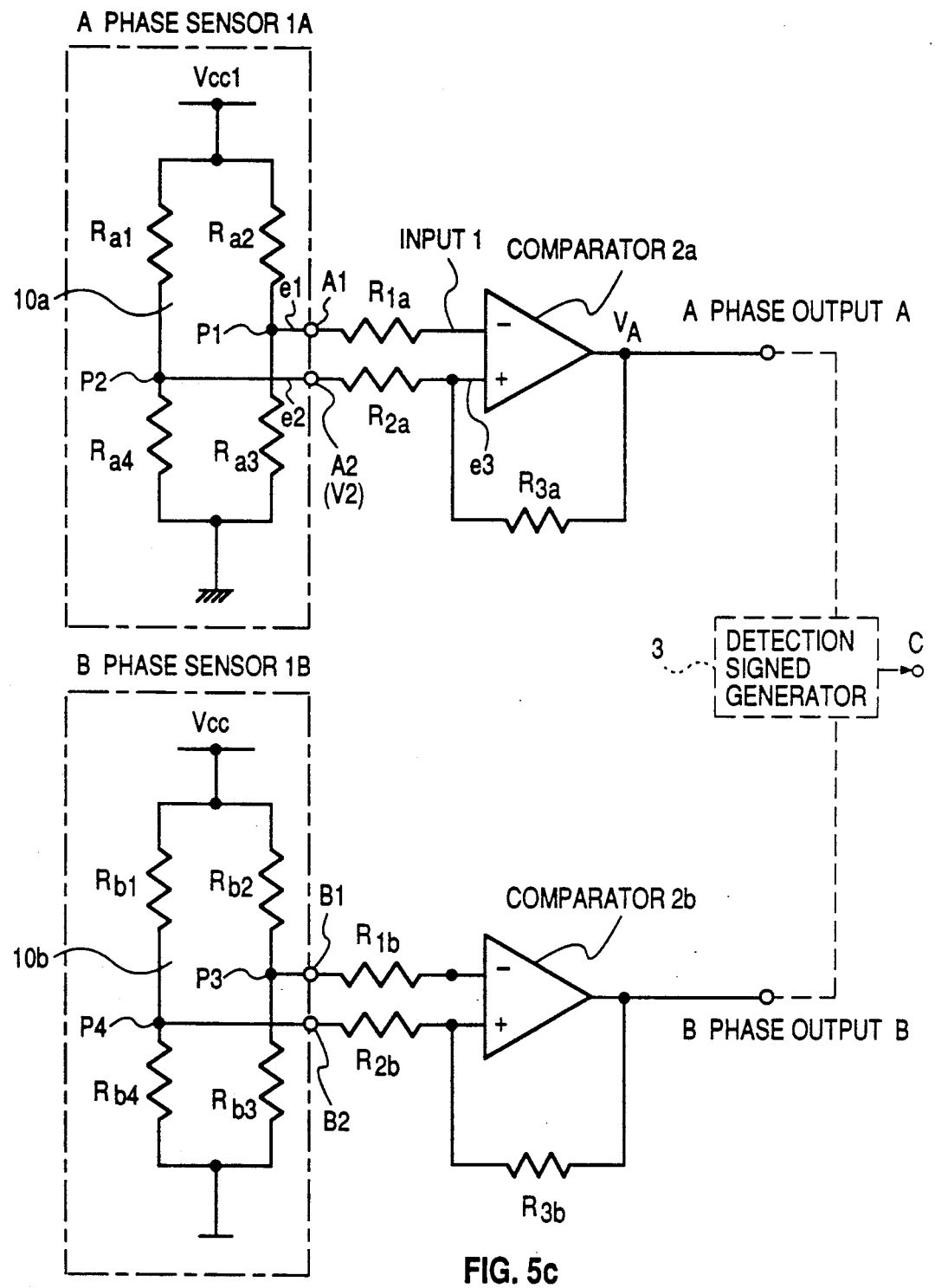
FIG. 5c is a schematic diagram of a prior art signal processing circuit for a magnetic rotary encoder.
Figure 7A:
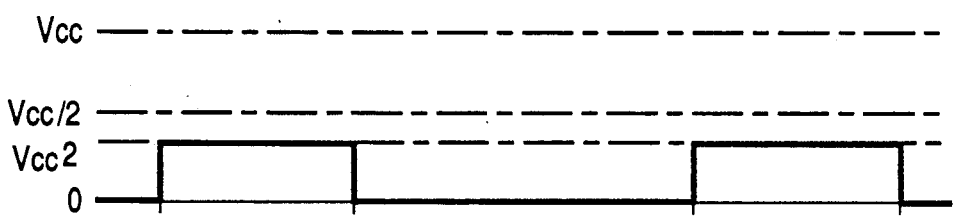
FIG. 7 is a wave diagram of a prior art signal processing circuit showing sensor output waveforms, comparator input waveforms and comparator output waveforms $V_{cc2}$ is less than $V_{cc}$.
Figure 7B:
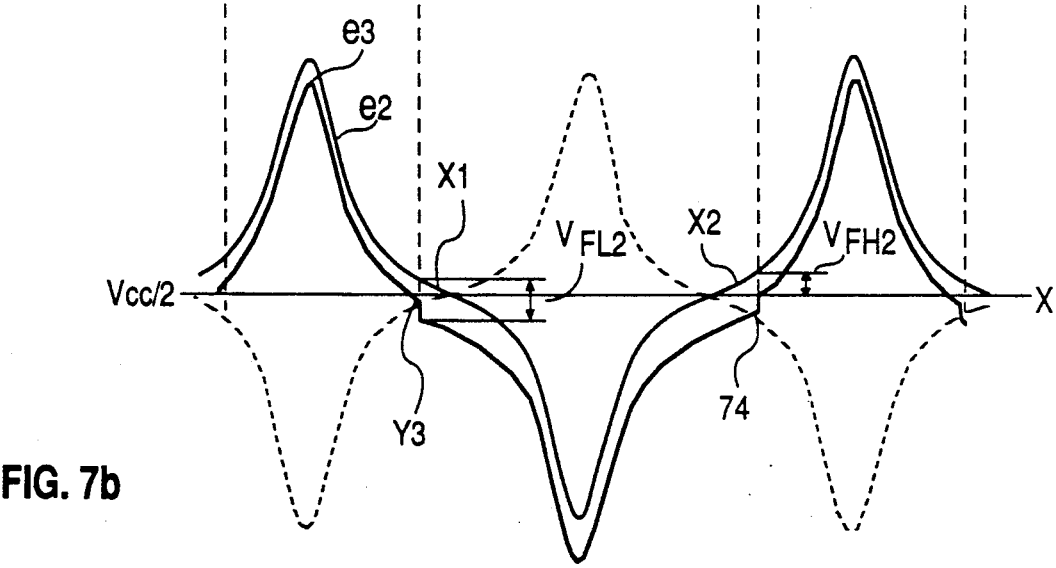
Figure 8:
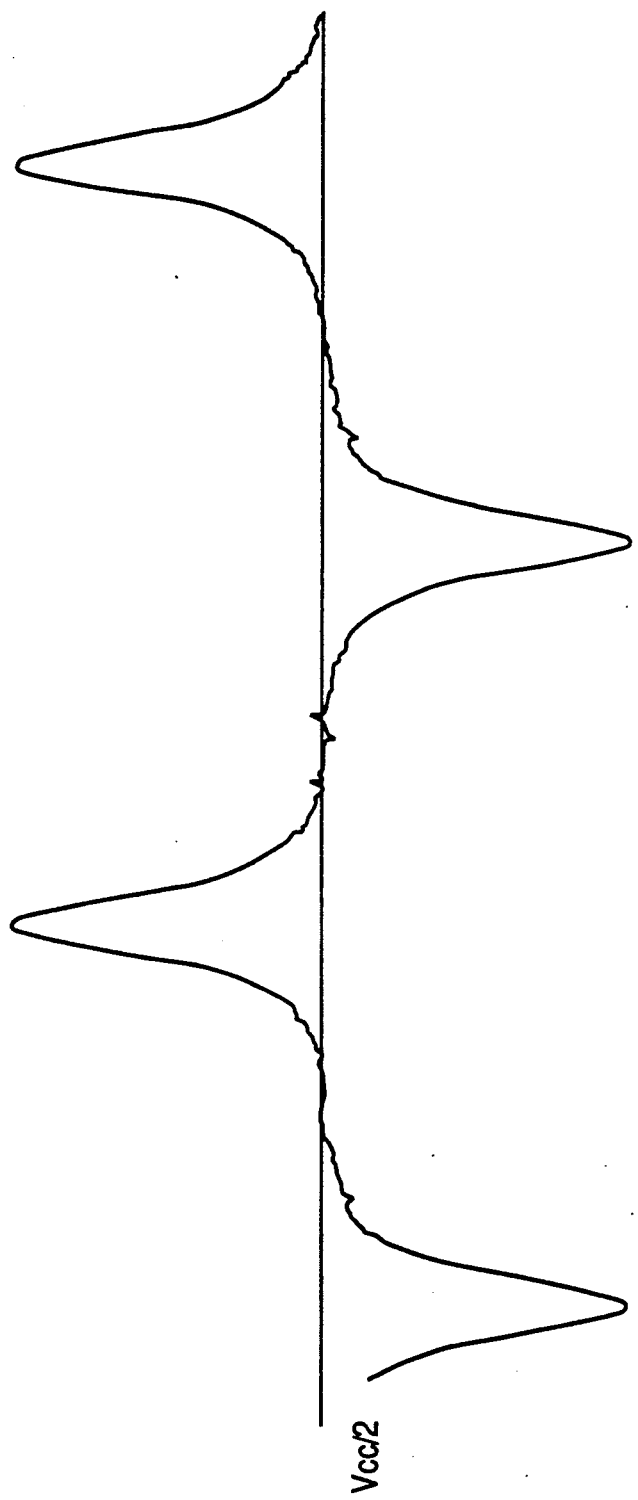
FIG. 8 is a wave diagram showing a typical output waveform of a magnetic resistance sensor.

FIGS. 2 and 3 are analogous to FIGS. 6 and 7, except that FIGS. 2 and 3 include an additional waveform e4 which is the input waveform to the inverting terminal of the comparator 2a after the output A1 of the sensor is displaced by feedback provided through resistor R6. The voltage displacement of waveform e4 is similar to that of e3 in the prior art, and is given by:

$$(V_A - V_{cc}/2) [R1a/(R1a + R6a)]$$

As in FIGS. 6 and 7 waveform e3 represents the input to the non-inverting terminal of the comparator after the output e2 of the MR sensor 1a is displaced by means of positive feedback provided through R5. The voltage displacement of e3 is given by:

$$(V_A - V_{cc}/2) [R2a/(R2a + R5a)]$$

In the embodiment shown in FIG. 2, the source voltage of the comparator $V_{cc2}$ is equal to the source voltage of the sensors $V_{cc1}$. This results in the same amplitude displacement of both sensor output waveforms whether the comparator output is high or low. The triggering intersection points y5 and y6 are offset in the same amount and in the same direction from the corresponding output intersection points x1 and x2, respectively; consequently, the time interval between the triggering intersection points y5 and y6, and correspondingly the interval during which the comparator output is in the low state, accurately represents the time interval between output intersection points x1 and x2. Thus, there is no distortion of the duty cycle.

FIG. 3 shows waveforms associated with the circuit in FIG. 1 when the source voltage $V_{cc2}$ of comparator 2a is less than one-half of the source voltage $V_{cc1}$ of the sensor 2a. Under this condition, the prior art circuitry caused a distortion in the duty cycle. However, in the present invention because of the additional positive feedback provided by R6 to the inverting terminal of comparator 2a, the duty cycle is not distorted. As shown in FIG. 3b, two output intersection points are x1 and x2, and corresponding triggering intersection points of waveforms e3 and e4 are the points Y7 and Y8. Z1 and Z2 are the prior art triggering intersection points of waveforms e3 and e1 that would control the comparator output in prior art signal processing circuits. Because source voltage $V_{cc1}$ of comparator 2a is less than source voltage $V_{cc2}$ of sensor 1a, the prior art triggering intersection points Z1 and Z2 are offset in different directions from the output intersection points which would result in a distortion of the duty cycle as explained above. However, the actual triggering intersection points y7 and y8 are offset from corresponding output intersection points x1 and x2, respectively, in the same amount and in the same direction, because of the additional feedback provided through resistor R6 to the inverting input terminal of comparator 2a. The additional feedback displaces the inverting comparator input waveform from e1 to e4 which shifts the actual triggering intersection points which control comparator 2a output. By appropriately selecting the values of the feedback resistors, the time interval of the low output of the comparator 2a between points c7 and c8 will accurately represent the time interval between output intersection points x1 and x2 of the sensor output waveforms e1 and e2.

It is desirable to provide a comparator source voltage lower than the sensor source voltage in order to reduce power consumption in the signal processing circuit, and further in order to miniaturize the circuit.

In addition, to cut down a output current in the MR sensor because it is restricted to minimize the resistance in MR sensor, the power voltage at the side of wave processing circuit will be higher than the one at MR sensor when the overall voltage of MR sensor is designed in lower. Even more, in the example described in FIG. 1, a comparator 2a is formed of open collector comparison circuit, the power voltage $V_{cc}$ of wave processing circuit is added to the output terminal as a pull of voltage, and the condition is explained when the pull of voltage is different from the power voltage of MR sensor. But, when the comparator is formed of push pull circuit, the distortion in the output wave, caused by the difference power voltage between comparator and MR sensor, can be eliminated by the invention.

What we claimed is as follows:

1. A signal processing circuit for a movement tracking encoder comprising:
   two sensors each with two output terminals;
   two comparators, each associated with one sensor, wherein a first output terminal of each sensor is coupled to the inverting terminal of the associated comparator and a second output terminal of each sensor is coupled to the non-inverting terminal of the associated comparator;
   a first feedback circuit for each comparator coupling the comparator output terminal to the non-inverting comparator input terminal;
   a second feedback circuit for each comparator coupling the comparator output terminal to the inverting comparator input terminal.

2. A signal processing circuit as recited in claim 1 wherein said movement tracking encoder includes a scale comprising a plurality of magnetic elements wherein the movement of said scale is sensed by magnetic coupling to said sensors.

3. A signal processing circuit as recited in claim 1 wherein each of said sensors comprises four resistive elements arranged in a bridge circuit configuration.

4. A signal processing circuit as recited in claim 1 wherein said movement tracking encoder is a magnetic rotary encoder comprising:
   a magnetic drum; and
   a scale comprising a plurality of magnetic elements wherein the movement of said scale is sensed by magnetic coupling to said sensors, said scale positioned along an outer surface of said magnetic drum.

5. A signal processing circuit as recited in claim 4 wherein said sensors sense a magnetic field produced by said magnetic elements, said sensors comprising magnetoresistive elements.

6. A signal processing circuit as recited in claim 1 wherein said second feedback circuit includes an inverter coupled from the output terminal of the associated comparator to the inverting terminal of the associated comparator.

* * * * *